US012066453B2

(12) United States Patent
Kwon et al.

(10) Patent No.: US 12,066,453 B2
(45) Date of Patent: Aug. 20, 2024

(54) APPARATUS AND METHOD FOR IMPROVING RESOLUTION AND ACCURACY OF IMU SENSOR USING DEEP LEARNING

(71) Applicant: Electronics and Telecommunications Research Institute, Daejeon (KR)

(72) Inventors: Woo Kyong Kwon, Daegu (KR); Yong Sik Jin, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 55 days.

(21) Appl. No.: 17/497,780

(22) Filed: Oct. 8, 2021

(65) Prior Publication Data

US 2022/0206037 A1 Jun. 30, 2022

(30) Foreign Application Priority Data

Dec. 24, 2020 (KR) .................. 10-2020-0183101

(51) Int. Cl.
*G01F 15/08* (2006.01)
*G01P 3/44* (2006.01)
*G01P 15/08* (2006.01)
*G06N 20/00* (2019.01)

(52) U.S. Cl.
CPC ............... *G01P 15/08* (2013.01); *G01P 3/44* (2013.01); *G06N 20/00* (2019.01)

(58) Field of Classification Search
CPC ........... G01P 15/08; G01P 3/44; G06N 20/00; G06N 3/044
See application file for complete search history.

(56) References Cited

U.S. PATENT DOCUMENTS

| 8,155,874 | B2 | 4/2012 | Cho et al. | |
|---|---|---|---|---|
| 9,664,528 | B2 | 5/2017 | Boran | |
| 10,268,882 | B2 | 4/2019 | Lee et al. | |
| 2012/0232792 | A1* | 9/2012 | Ding | G01S 19/49 |
| | | | | 701/472 |
| 2017/0010126 | A1 | 1/2017 | Han et al. | |
| 2020/0311514 | A1* | 10/2020 | Speranzon | G01C 25/00 |

FOREIGN PATENT DOCUMENTS

| KR | 10-0443550 B1 | 8/2004 |
|---|---|---|
| KR | 10-2012-0098321 A | 9/2012 |
| KR | 10-2014-0138635 A | 12/2014 |
| KR | 10-1739390 B1 | 5/2017 |

* cited by examiner

*Primary Examiner* — Manuel A Rivera Vargas

(57) ABSTRACT

The present invention relates to an apparatus and method for improving resolution and attitude estimation accuracy of an inertial measurement unit (IMU) sensor using deep learning. The apparatus for improving the resolution and the attitude estimation accuracy of the IMU sensor using deep learning according to the present invention includes an input unit configured to acquire data of an IMU sensor, a memory configured to store a performance improvement program of the IMU sensor, and a processor configured to execute the program, wherein the processor serves to improve accuracy and resolution of acceleration and angular velocity of the data of the IMU sensor by performing deep learning.

7 Claims, 5 Drawing Sheets

APPARATUS AND METHOD FOR IMPROVING RESOLUTION AND ACCURACY OF IMU SENSOR USING DEEP LEARNING

CROSS-REFERENCE TO RELATED APPLICATION

This application claims priority to and the benefit of Korean Patent Application No. 10-2020-0183101, filed on Dec. 24, 2020, the disclosure of which is incorporated herein by reference in its entirety.

BACKGROUND

1. Field of the Invention

The present invention relates to an apparatus and method for improving resolution and attitude estimation accuracy of an inertial measurement unit (IMU) sensor using deep learning.

2. Discussion of Related Art

An inertial measurement unit (IMU) sensor is a sensor device that can measure the movement of an object by recording changes in inertia.

According to the related art, there is a problem in that errors are large due to a microelectromechanical systems (MEMS) method used in a low-priced IMU sensor.

SUMMARY OF THE INVENTION

In order to solve the above problems, the present invention is directed to providing an apparatus and method for improving resolution and attitude estimation accuracy of an inertial measurement unit (IMU) sensor using deep learning.

The present invention relates to an apparatus and method for improving resolution and attitude estimation accuracy of an IMU sensor using deep learning.

According to an aspect of the present invention, there is provided an apparatus for improving resolution and attitude estimation accuracy of an IMU sensor using deep learning, which includes an input unit configured to acquire data of an IMU sensor, a memory configured to store a performance improvement program of the IMU sensor, and a processor configured to execute the program, wherein the processor serves to improve accuracy and resolution of acceleration and angular velocity of the data of the IMU sensor by performing deep learning.

In at least one of a training process and a use process, an acceleration value and an angular acceleration value, which are measured by at least one of a camera sensor, a LiDAR sensor, an encoder sensor, and a velocity measuring sensor, may be used.

Preprocessing may be performed on the acceleration value and the angular acceleration value.

In the training process, a value measured by an IMU sensor with higher performance than an IMU sensor to be improved may be used.

According to another aspect of the present invention, there is provided a method of improving resolution and attitude estimation accuracy of an IMU sensor using deep learning, which includes an operation (a) of training a performance improvement module of an IMU sensor and an operation (b) of receiving a signal measured by the IMU sensor and outputting improved inertial data.

The operation (a) may include performing training using an acceleration value and an angular acceleration value which are measured by at least one of a camera sensor, a LiDAR sensor, an encoder sensor, and a velocity measuring sensor.

The operation (a) may include performing preprocessing on the acceleration value and the angular acceleration value.

The operation (a) may include performing the training using a value measured by an IMU sensor with higher performance than an IMU sensor to be improved.

The operation (b) may include outputting improved inertial data using data measured by at least one of a camera sensor, a LiDAR sensor, an encoder sensor, and a velocity measuring sensor in addition to the signal measured by the IMU sensor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
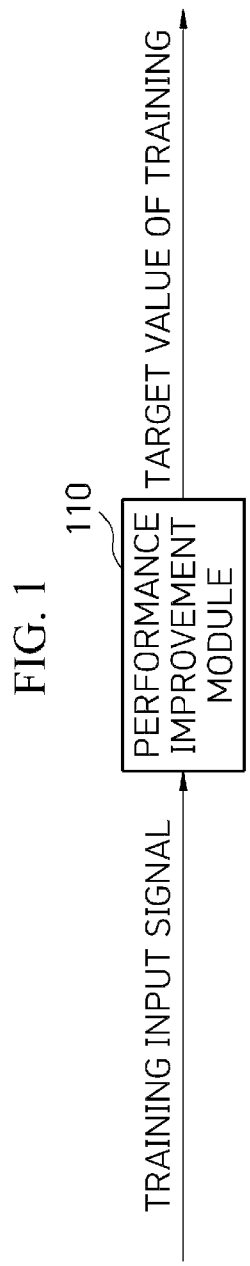
FIG. 1 illustrates an input signal and a target value of training according to an embodiment of the present invention.

The above-described objects, other objects, advantages, and features of the present invention and methods of achieving the same will be clearly understood with reference to the accompanying drawings and the following detailed embodiments.

However, the present invention is not limited to the embodiments to be disclosed below and may be implemented in various different forms. The following embodiments are merely provided to easily inform those skilled in the art of the objects, configuration, and effects of the present invention. The scope of the present invention is defined by the appended claims.

Meanwhile, terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Hereinafter, in order to aid understanding of those skilled in the art, a background in which the present invention is proposed will be described first and embodiments of the present invention will be described.

An inertial measurement unit (IMU) sensor is a sensor device that can measure the movement of an object by recording changes in inertia.

An attitude estimation system using an IMU sensor is applicable to mobile robots that perform various functions and, specifically, is applicable to guide robots that guide visitors and provide information, cleaning robots that move while avoiding obstacles, transport robots that transport products in smart factories and warehouses, and the like.

There is an industrial demand for attitude control systems not only in mobile robots and vehicles but also in construction machinery, aviation, ships, and satellites, and research cases applied to balance control of unmanned bikes or ball robots have been reported until recently.

Since the complexity and instability of devices for attitude control may increase depending on a degree of freedom to move a body thereof or the number of axes, it is important to develop a stable balance control algorithm to prevent the increase in complexity and instability.

Rapid estimation of a roll or pitch angle when a moving object cannot maintain a horizontal attitude is technically very important and is a basic element of an attitude control technique.

IMU sensors are used in various high-tech devices such as robots, autonomous vehicles, cellphones, and the like. In particular, in order to accurately determine an attitude in autonomous driving technology, precision of the IMU sensor is required.

However, in microelectromechanical systems (MEMS) sensors used in low-priced IMU sensors, errors are large, and thus in the case of estimating an angle through the integration using a gyro sensor, there is a phenomenon in which errors are accumulated and become large, and thus an attitude of an object should be changed continuously. In order to solve the above problem, the errors are reduced by performing filtering according to the purpose.

As a filter for performance improvement, a conventional signal processing-based Kalman filter or complementary filter is mainly used.

In order to solve the above problems, in the present invention, an apparatus and method for improving performance of a low-priced IMU sensor using a deep learning algorithm and a structure that restores a corresponding target signal by using signals of a high-priced IMU sensor or signals of multiple sensors capable of extracting attitudes as target signals are proposed.

The fields of attitude estimation and control of moving objects continue to grow based on new techniques developed every year domestically and abroad.

Attitude control may be divided into active attitude control and passive attitude control. The active attitude control and the passive attitude control should be technically and appropriately combined with each other as necessary.

IMU sensors have traditionally been widely used in the fields of attitude estimation and control and superior techniques are continuously being developed through fusion with existing techniques.

In addition, the IMU sensors may be applied in various fields and fields requiring high stability through appropriate fusion with various sensors.

According to the embodiment of the present invention, it is possible to design a deep learning-based filter capable of improving the performance of a low-priced IMU sensor and it is possible to improve estimation accuracy by applying a deep learning technique with architecture necessary for designing a filter for sensor.

According to the embodiment of the present invention, there is an effect in that the performance of an IMU sensor is improved using an algorithm with a deep-learning architecture so that resolution and accuracy of the IMU sensor are improved.

As a deep learning model, a convolutional neural network (CNN), a generative adversarial network (GAN), a recurrent neural network (RNN), or the like may be used.

FIG. 1 illustrates an input signal and a target value of training according to an embodiment of the present invention.

As an input of training of a performance improvement module 110 according to the embodiment of the present invention, data of an IMU sensor is used or data of various sensors (such as an image sensor, an encoder sensor, a LiDAR sensor, a velocity measuring sensor, etc.) are used together with the data of the IMU sensor.

In addition, in order to use information on previous acceleration and angular acceleration, pieces of data that are previously measured may be used together with each other.

As a target value of the training of the performance improvement module 110 according to the embodiment of the present invention, an actual acceleration value and angular acceleration value are used, or a value which is measured by a high-priced IMU sensor (such as an IMU sensor with higher performance than an IMU sensor to be improved) and an acceleration value and an angular acceleration value which are measured by another sensor (such as an image sensor, a LiDAR sensor, an encoder sensor, a velocity measuring sensor, etc.) are used.

Figure 2:
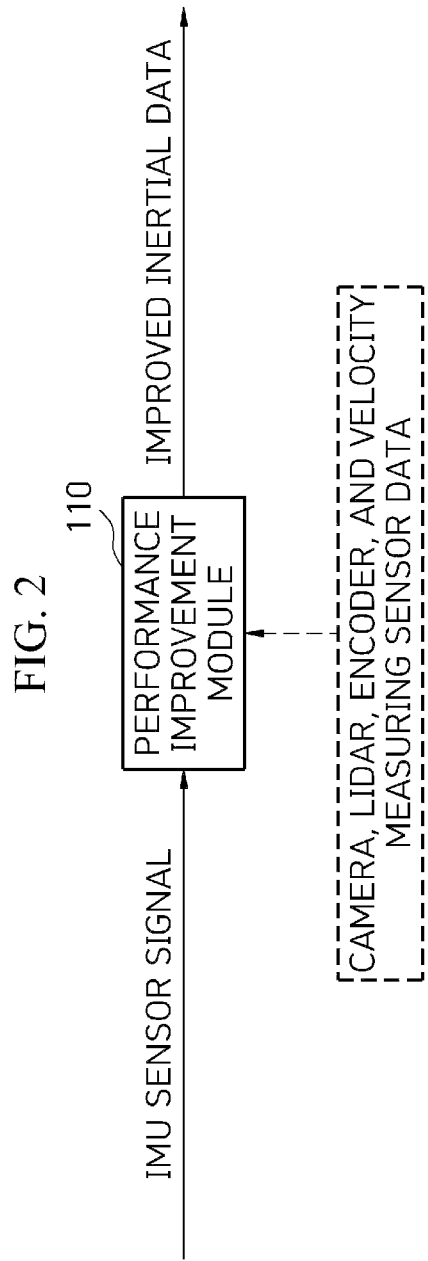
FIG. 2 illustrates a performance improvement module of an apparatus for improving resolution and attitude estimation accuracy of an inertial measurement unit (IMU) sensor using deep learning according to an embodiment of the present invention.

FIG. 2 illustrates a performance improvement module of an apparatus for improving resolution and attitude estimation accuracy of an IMU sensor using deep learning according to an embodiment of the present invention.

A performance improvement module 110 receives a signal (i.e., a signal of an IMU sensor) which is measured by the IMU sensor after training, improves accuracy and resolution of acceleration and angular velocity, and outputs improved inertial data.

In this case, it is possible to improve the performance of the IMU sensor by using data of an additional sensor (such as a camera sensor, a LiDAR sensor, an encoder sensor, a velocity measuring sensor, etc.) in addition to the signal of the IMU sensor and, even when only the signal of the IMU sensor is used, it is possible to improve the performance of the IMU sensor compared to the existing method.

When using a performance improvement method trained through the high-priced IMU sensor, it is possible to improve the performance of a low-priced IMU sensor to be similar to the performance of a high-priced IMU sensor and it is possible to apply the performance improvement method according to the embodiment of the present invention to other sensors such as a camera sensor, a LiDAR sensor, a radar sensor, and the like.

Figure 3:
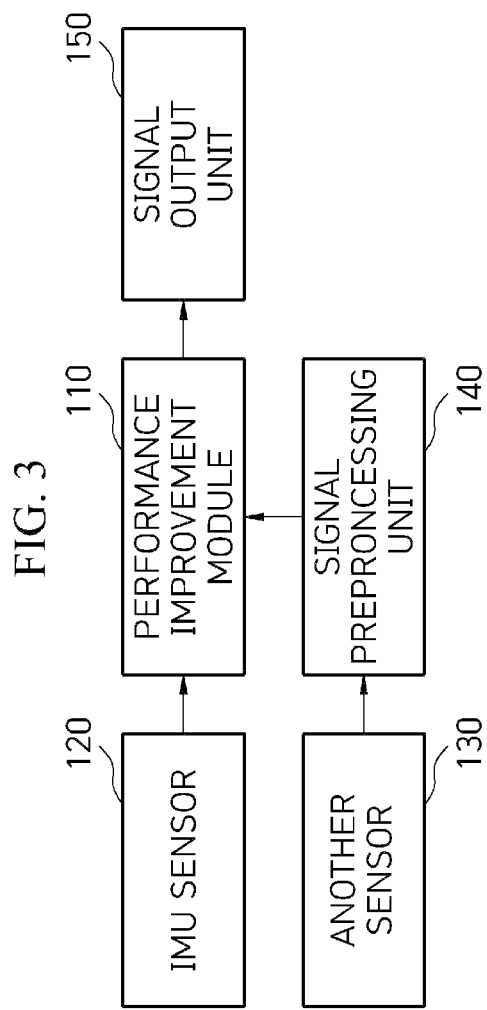
FIGS. 3 and 4 illustrate an apparatus for improving resolution and attitude estimation accuracy of an IMU sensor using deep learning according to an embodiment of the present invention.
Figure 4:
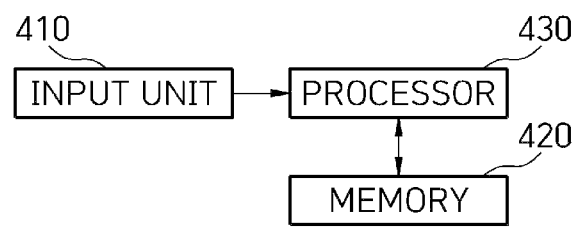

FIGS. 3 and 4 illustrate an apparatus for improving resolution and attitude estimation accuracy of an IMU sensor using deep learning according to an embodiment of the present invention.

The apparatus for improving the resolution and the attitude estimation accuracy of the IMU sensor using deep learning according to the embodiment of the present invention may be implemented in an IMU sensor module and may be implemented in a separate additional module or implemented using an external computer device through communication.

A performance improvement module 110 receives data from an IMU sensor 120, and a signal preprocessing unit 140 receives data acquired by another sensor (such as a camera sensor, a LiDAR sensor, an encoder sensor, a velocity measuring sensor, etc.) 130 and performs preprocessing on the data.

An output of the performance improvement module 110 is output to a communication device through a signal output unit 150.

According to the embodiment of the present invention, a filter is designed using a deep learning technique to improve the performance of the IMU sensor, and thus estimation accuracy and precision of the performance of a low-performance IMU sensor are improved.

The apparatus for improving the resolution and the attitude estimation accuracy of the IMU sensor using deep learning according to the embodiment of the present invention includes an input unit 410 configured to acquire data of the IMU sensor, a memory 420 configured to store a performance improvement program of the IMU sensor, and a processor 430 configured to execute the program. The processor 430 serves to improve accuracy and resolution of acceleration and angular velocity of the data of the IMU sensor by performing deep learning.

In a training process, an acceleration value and an angular acceleration value which are measured by at least one of a camera sensor, a LiDAR sensor, an encoder sensor, and a velocity measuring sensor are used.

In the training process, preprocessing is performed on the acceleration value and the angular acceleration value.

In the training process, a value measured by an IMU sensor with higher performance than an IMU sensor to be improved is used.

Figure 5:
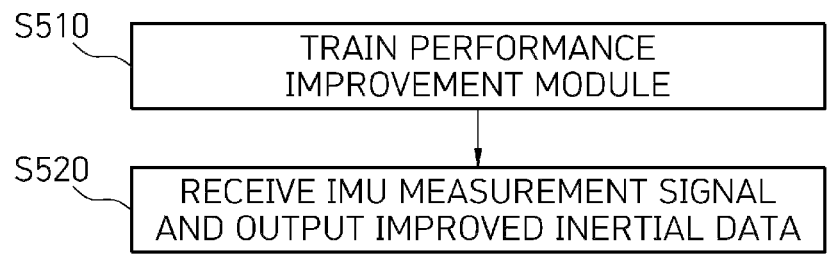
FIG. 5 illustrates a method of improving resolution and attitude estimation accuracy of an IMU sensor using deep learning according to an embodiment of the present invention.

FIG. 5 illustrates a method of improving resolution and attitude estimation accuracy of an IMU sensor using deep learning according to an embodiment of the present invention.

The method of improving the resolution and the attitude estimation accuracy of the IMU sensor using deep learning according to the embodiment of the present invention includes an operation (S510) of training a performance improvement module and an operation (S520) of receiving a signal measured by the IMU sensor and outputting improved inertial data.

In operation S510, training is performed using an acceleration value and an angular acceleration value which are measured by at least one of a camera sensor, a LiDAR sensor, an encoder sensor, and a velocity measuring sensor.

In operation S510, preprocessing is performed on the acceleration value and the angular acceleration value.

In operation S510, the training is performed using a value measured by an IMU sensor with higher performance than an IMU sensor to be improved.

In operation S520, in addition to the signal measured by the IMU sensor, data measured by the at least one of the camera sensor, the LiDAR sensor, the encoder sensor, and the velocity measuring sensor is used and improved inertial data is output.

Meanwhile, the method of improving the resolution and the attitude estimation accuracy of the IMU sensor using deep learning according to the embodiment of the present invention may be implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device that processes instructions stored in the memory and/or the storage.

The memory and the storage may include various types of volatile or nonvolatile storage media. For example, the memory may include a read only memory (ROM) and a random access memory (RAM).

Therefore, the method of improving the resolution and the attitude estimation accuracy of the IMU sensor using deep learning according to the embodiment of the present invention may be implemented as a computer-executable method. When the method of improving the resolution and the attitude estimation accuracy of the IMU sensor using deep learning according to the embodiment of the present invention is performed in a computer device, computer-readable instructions may perform the method of improving the resolution and the attitude estimation accuracy of the IMU sensor using deep learning according to the present invention.

Meanwhile, the method of improving the resolution and the attitude estimation accuracy of the IMU sensor using deep learning according to the present invention described above may be implemented as computer readable code in a computer-readable recording medium. The computer-readable recording medium includes any type of recording medium in which data that can be decoded by a computer system is stored. For example, a ROM, a RAM, a magnetic tape, a magnetic disk, a flash memory, an optical data storage device, and the like may be exemplified. In addition, computer-readable recording media may be distributed in computer systems connected through a computer communication network and may be stored and executed as code that can be read in a distributed manner.

According to the present invention, by improving resolution and accuracy of a low-priced sensor, it is possible to reduce the cost compared to having an IMU sensor with high specification.

Requirements for maintaining balance are fundamental in almost all modern mobile robot fields, and thus the present invention is applicable to various moving object fields requiring attitude control, is applicable not only to a vehicle-type moving object driven by two or four wheels but also to various systems operating in water, space environments, etc., and is applicable to platforms, which require attitude control, such as ships, construction machinery, satellites, and the like.

When the method of improving the resolution and attitude estimation accuracy of a low-priced sensor according to the present invention is combined with other techniques for improving the performance in balance control, the method is expected to be used in very wide fields.

Effects of the present invention are not limited to the above-described effects and other effects which have not been described may be clearly understood by those skilled in the art from the above detailed descriptions.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for improving resolution and attitude estimation accuracy of an inertial measurement unit (IMU) sensor using deep learning, the apparatus comprising:
an input unit configured to acquire data of a first IMU sensor;
a memory configured to store a performance improvement program of the first IMU sensor; and
a processor configured to execute the performance improvement program,
wherein the processor serves to improve accuracy and resolution of acceleration and angular velocity of the data of the first IMU sensor by performing a training process using deep learning,
wherein, in the training process, a value measured by a second IMU sensor with performance higher than that of the first IMU sensor is used, the performance including accuracy and resolution of acceleration and angular velocity, and
wherein the processor receives a signal measured by the first IMU sensor after the training process, improves accuracy and resolution of acceleration and angular velocity of the first IMU sensor using results of the training process, and then outputs improved inertial data.

2. The apparatus of claim 1, wherein, in at least one of the training process and a use process, an acceleration value and an angular acceleration value, which are measured by at least one of a camera sensor, a LiDAR sensor, an encoder sensor, and a velocity measuring sensor, are used.

3. The apparatus of claim 2, wherein preprocessing is performed on the acceleration value and the angular acceleration value.

4. A method of improving resolution and attitude estimation accuracy of an inertial measurement unit (IMU) sensor using deep learning, the method comprising:
 an operation (a) of training a performance improvement module of a first IMU sensor; and
 an operation (b) of receiving a signal measured by the first IMU sensor and outputting improved inertial data,
 wherein the operation (a) includes performing a training process using a value measured by a second IMU sensor with performance higher than that of the first IMU sensor, the performance including accuracy and resolution of acceleration and angular velocity, and
 wherein the operation (b) includes receiving the signal measured by the first IMU sensor after the training process, improving accuracy and resolution of acceleration and angular velocity of the first IMU sensor using the trained performance improvement module, and then outputting the improved inertial data.

5. The method of claim 4, wherein the operation (a) includes performing the training process using an acceleration value and an angular acceleration value which are measured by at least one of a camera sensor, a LiDAR sensor, an encoder sensor, and a velocity measuring sensor.

6. The method of claim 5, wherein the operation (a) includes performing preprocessing on the acceleration value and the angular acceleration value.

7. The method of claim 4, wherein the operation (b) includes outputting the improved inertial data using data measured by at least one of a camera sensor, a LiDAR sensor, an encoder sensor, and a velocity measuring sensor in addition to the signal measured by the first IMU sensor.

* * * * *